United States Patent [19]

Barth et al.

[11] 4,253,040

[45] Feb. 24, 1981

[54] CATHODE STRUCTURE FOR A GAS DISCHARGE DISPLAY TUBE

[75] Inventors: Heinz Barth, Munich; Heinz Meier, Pliening; Joseph Schramm, Munich, all of Fed. Rep. of Germany

[73] Assignee: Siemens Aktiengesellschaft, Berlin & Munich, Fed. Rep. of Germany

[21] Appl. No.: 57,125

[22] Filed: Jul. 11, 1979

[30] Foreign Application Priority Data

Jul. 20, 1978 [DE] Fed. Rep. of Germany ....... 2831962

[51] Int. Cl.[3] ........................ H05B 37/00; H04N 3/16

[52] U.S. Cl. .................................... 313/517; 313/217; 313/491

[58] Field of Search ........................ 313/217, 517, 220

[56] References Cited

U.S. PATENT DOCUMENTS

| | | | |
|---|---|---|---|
| 3,956,667 | 5/1976 | Veith | 313/217 X |
| 4,130,778 | 12/1978 | Branston | 313/326 |

FOREIGN PATENT DOCUMENTS

| | | |
|---|---|---|
| 2412869 | 10/1975 | Fed. Rep. of Germany . |
| 2643915 | 3/1978 | Fed. Rep. of Germany . |

*Primary Examiner*—Robert Segal

*Attorney, Agent, or Firm*—Hill, Van Santen, Steadman, Chiara & Simpson

[57] ABSTRACT

A gas discharge display tube, which has a rear tube wall with parallel extending cathode strips mounted thereon characterized by the cathode strips being mounted by each strip having a pair of spring plates slidably received on pins which are fused into the rear wall of the tube. Preferably, each of the strips has a box-like cross section for slidably receiving the spring plates so that the strip can be shifted along its length on the pins. In addition, the pins for adjacent strips are offset from each other so that the pins are aligned in two rows at each end of each of the cathode strips.

6 Claims, 3 Drawing Figures

CATHODE STRUCTURE FOR A GAS DISCHARGE DISPLAY TUBE

BACKGROUND OF THE INVENTION

The present invention is directed to a gas discharge display tube, which has a rear wall and has a plurality of cathode strips, which are disposed to extend parallel to one another, are isolated from one another and are separately actuated.

A gas discharge display device, which has a cathode formed by a plurality of parallel strips, which were isolated from each other, and were separately actuated, is disclosed in German Offenlegungsschrift No. 26 43 915, which was the basis for U.S. Pat. No. 4,130,778. The division of the cathode into several strip-shaped cathodes, which are insulated from one another, was a further development of a surface cathode, such as was required for gas discharge display tubes, which is known and, for example, described in German Offenlegungsschrift No. 24 12 869, which was the basis for U.S. Pat. No. 3,956,667, and which disclosed a so-called plasma panel, or plasma or gas discharge display.

The above display functions according to the principle of a spatial separation of electron generation and the electron acceleration. The tube utilized to this end is divided into two chambers, which are interconnected by a conductor matrix provided with holes at the intersecting points of rows and colums of electrodes. The rear chamber, as viewed from the observer's point of view, is the space for the gas discharge which is sealed off by the surface cathode at the rear wall of the tube and by the strip-shaped auxiliary anodes arranged in rows on the conductor matrix. The front chamber is the post acceleration space between the column plane of the column electrodes of the conductor matrix and the surface anode which represents a fluorescent screen electrode. By actuating or operating one of the auxiliary anodes, a wedge-shaped gas discharge results between the surface cathode and the axuiliary anode over the entire length of the two. In the event of simultaneous actuation of one of the strip-shaped control electrodes serving as a matrix column, the plasma electrons generated in the gas discharge are drawn through the opening at the intersection point of the row and the column into the post acceleration space and to the anode. At the impact location, there will then result on the illuminescent material disposed in front of the anode, a light point as an image of the activated intersection point of the matrix. With corresponding matrix actuations in accordance with a chronological sequence and strength, characters and images can be represented on the fluorescent screen.

In order to guarantee the wedge-shaped gas discharge in every operating condition, the surface cathode is advantageously divided into a plurality of partial cathodes or strip cathodes which extend parallel to the auxiliary anodes. A group of the auxiliary anodes is then associated with each partial or strip cathode. Through an actuation of a partial or strip cathode, which is concommitant with the auxiliary anode actuation, the wedge-shaped gas discharge results only between specific auxiliary anodes and specific partial or strip cathodes. The division of the cathode, i.e. the number of cathode strips and the number of auxiliary anodes of a group which are allotted to each cathode strip, is dependent upon the application purposes and the operating parameters such as the type of gas and gas pressure being used.

SUMMARY OF THE INVENTION

The present invention is directed to providing a gas discharge device having mountings for strip cathodes which mountings are spaced saving and can be easily fabricated.

To accomplish this task, the present invention is directed to an improvement in a gas discharge display tube having a rear wall, having cathode strips, which are separately actuated, and means mounting the cathode strips adjacent the rear wall with the strips being parallel to one another and insulated to one another. The improvement comprises the means for mounting including at least two pins for each cathode strip, said pins being fused into the rear wall of the tube, and a spring plate slidably received on each of said pins, each of said cathode strips having longitudinal edge portions extending toward the rear wall to hold the pair of spring plates on the strips so that the cathode strip is mounted on said rear wall.

The improved mounting means enables easy assembly of the cathode strips and requires a minimal structural depth. Since the cathode strips are disposed on the ends of the pins by the clamping spring plates, only a short end of the pin is required to project from the rear wall of the tube into the interior of the tube and thus the pins can be very short. The ends of the pins, which project through the wall to the exterior side can be easily electrically connected into a circuit by a socket terminal strip or board. In addition, since the cathode strips can be mounted to lie close to one another, a complete surface cathode may be formed. Because the edge portion of each of the cathode strips extends toward the rear and keeps the field strengths or intensities low, the insulation spacing between each of the adjacent strips can be minimal. An additional advantage of the inventive mounting means of the cathode strips is that the strips can be slid in the longitudinal direction on the spring plates and thus compensate for any thermal expansion.

An advantageous embodiment consists in extending the longitudinal edge portion sufficiently toward the rear wall to mask the pins of the mounting means for the strip against material which is sputtered off the cathode. It is particularly advantageous if the edge portion has a further bent portion extending inwardly so that the cathode strip has a box-like cross-sectional profile for receiving and securing each of the spring plates.

During operation of the gas discharge tube, a cathode sputtering cannot be avoided to a certain degree. The good surface coverage due to the narrow gaps between the cathode strips and the covering of the pins largely prevents a deposition of the sputter cathode material onto the rear wall surface and thus maintains an insulation between the cathode strips.

Further advantageous embodiments of the invention are characterized in that the adjacent pins of adjacent disposed cathode strips are offset relatively to one another in the longitudinal direction of the cathode strips so that in particular the pins of three adjacently disposed consecutive strips will be brought to lie approximately in the corner of an equilateral triangle. By such an arrangement, the spacing distance between adjacent mounting pins from one another is enlarged and the insulation of the pins is therefore improved.

DESCRIPTION OF THE PREFERRED EMBODIMENTS

Figure 1:
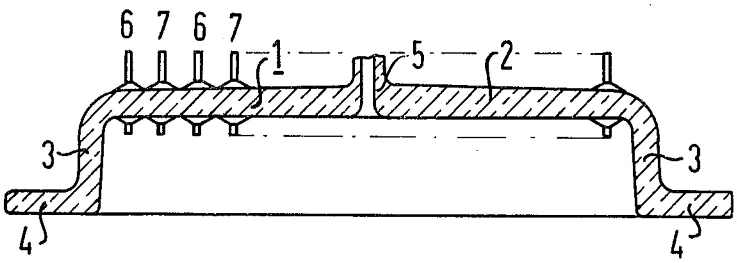
FIG. 1 illustrates a cross section of a rear section of a gas discharge tube in accordance with the present invention.
Figure 2:
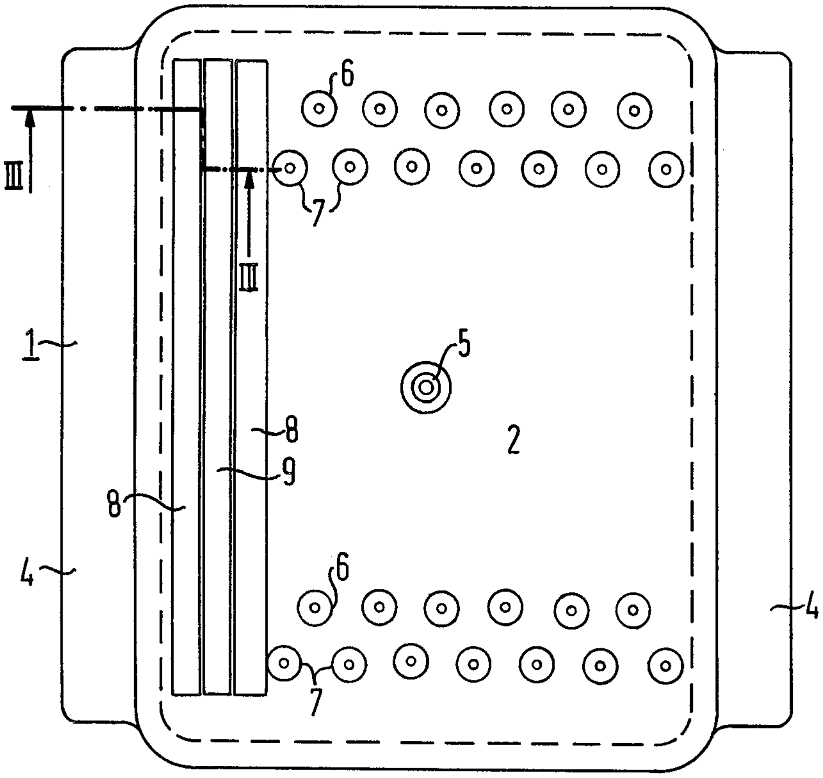
FIG. 2 is a plan view from the interior of the rear section of a gas discharge tube in accordance with the present invention containing three cathode strips.

The principles of the present invention are particularly useful in a gas discharge device having a rear section 1, which forms the discharge space of the device and is best illustrated in FIGS. 1 and 2. The rear section 1 consists of glass and has a rear wall 2 with lateral walls or edges 3 that terminate in laterally extending flanges 4. In the center of the rear wall 2, a connection piece 5 is secured and is provided with an opening for the evacuation of the tube and the filling of the gas into the tube. The flanges 4 serve the purpose of accommodating or supporting the conductor matrix and forming a connection with the front section which is the post acceleration space of the tube. Pins 6 and 7 extend through the rear wall 2 in an alternate sequence and as illustrated have a hump-like elevation at both surfaces of the rear wall.

As best illustrated in FIG. 2, the pins 6 lie in one row and the pins 7 lie in a second row which is offset from the row of the pins 6. The amount of offset between the rows is such that a pin 6 is the same distance from an adjacent pin 7 as the distance between the two pins 7 in their row. In other words, the pins 7, 6, 7 lie substantially on the corners of an equilateral triangle.

As illustrated in FIG. 2, cathode strips 8 and 9 are provided and mounted in the section 1 so that they extend parallel to each other and are insulated to each other. As illustrated, the strips 8 are mounted on pins 6 while the strips 9 are mounted on pins 7. As illustrated, the amount of offset between the rows of the pins 6 and 7 is parallel to the longitudinal length of the electrode strips 8 and 9. In the illustration of FIG. 2, sixteen cathode strips 8 and 9 are to be provided.

Figure 3:
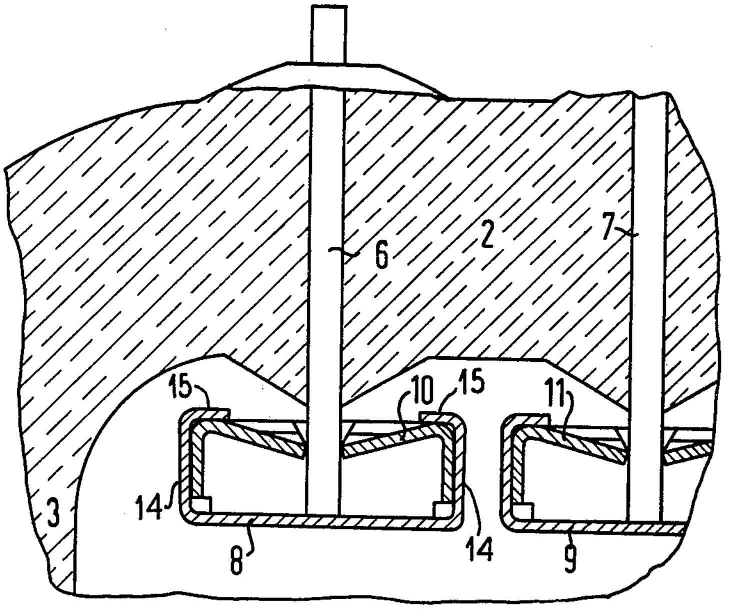
FIG. 3 is an enlarged cross section taken on line III—III of FIG. 2 to illustrate a cathode strip mounted in accordance with the present invention.

To mount the strips such as 8 and 9 on their respective pins 6 and 7, the mounting means, as best illustrated in FIG. 3, utilizes spring plates 10 and 11, respectively. As illustrated, the spring plate 10 is pressed onto the inner end of the pin 6, while the spring plate 11 is pressed onto the pin 7. Each of the springy plates is provided with a cup-shaped design and has a spring round base which is cut in a star formation about a central hole to form spring sectors. The pins 6 will project through the hole and is engaged by the spring sectors.

As illustrated, the inner end of the pin 6 engages the strip cathode 8 which consists preferably of aluminum sheet metal. Each of the cathode strips 8 and 9 are provided with longitudinal edge portions 14, 14, which extend toward the rear wall 2 and engage the edges of their respective spring plates such as 10. Preferably, each of the edge portions 14 has a second bent portion 15, which extend toward each other so that each of the strips 8 and 9 have a box-like cross-sectional configuration that securely engages the respective spring clips 10 and 11. As pointed out hereinabove, due to the edge portions 14 having a low field intensity, the spacing or gap between adjacent strips 8 and 9 is substantially narrow.

Due to the box-shaped profile each of the clips 10 and 11 is clearly supported on the strip but can be displaced in the longitudinal direction. Thus, adjustments or compensation can be made for thermal expansion or change in dimensions of the strips during operation.

Due to the amount that the edge portion 14 extends toward the back wall, a substantial portion of the pins such as 6 or 7 is masked from any material which may sputter off the cathode. In addition, the wall 2 behind the strips 8 and 9 due to the narrow gaps therebetween is substantially shielded or screened from many of the materials sputtered from the cathode. Thus, insulation of the electrical connections to various pins such as 6 and 7 is easily maintained.

The construction of the mounting means comprising the spring plates 10 and 11 and their respective pins 6 and 7 satisfies the function of mounting the strips in parallel, and also can be easily manufactured at minimal expense. In addition, the mounting means does not require a substantial amount of space.

Although various minor modifications may be suggested by those versed in the art, it should be understood that we wish to embody within the scope of the patent granted hereon, all such modifications as reasonably and properly come within the scope of our contribution to the art.

We claim:

1. In a gas discharge display tube having a rear wall, having cathode strips, which are separately actuated, and having means mounting the cathode strips adjacent the rear wall with the strips being parallel to one another and insulated from one another the improvement comprising said means for mounting including at least two pins for each cathode strip, said pins being fused into the rear wall of the tube, and a spring plate slidably received on each of said pins, each of said cathode strips having longitudinal edge portions extending toward the rear wall to hold a pair of spacing plates thereon so that the cathode strip is mounted on said rear wall.

2. In a gas discharge display tube according to claim 1, wherein the pins for adjacent cathode strips are disposed next to one another in an offset relationship along a direction parallel to the cathode strips with the amount of offset being selected so that the pins of three consecutive cathode strips, which are disposed next to one another, will lie approximately at the corners of an equilateral triangle.

3. In a gas discharge display tube according to claim 1, wherein each of the cathode strips has the longitudinal edge portions extending sufficiently toward the rear wall to mask the pins of the mounting means for the strip against material which has been sputtered off the cathode.

4. In a gas discharge display tube according to claim 3, wherein each cathode strip has two pins, the pins of adjacent strips being offset from each other in a direction extending parallel to the strips to form two rows of pins at each end of the cathode strips with the distance between pins in the same row being equal to the distance of a pin in one row to an adjacent pin in the other row.

5. In a gas discharge display tube according to claim 1, wherein each of the cathode ray strips has its side edge portions having a second bent portion extending toward each other so that each of the cathode strips has a box-like profile for securing the spring plates.

6. In a gas discharge display tube according to claim 5, wherein each of the pins for the gas discharge strips are arranged in rows with the pins of one strip being in a row which is offset from the row for the pins of the adjacent strip, each of the rows being offset a sufficient distance so that the distance from a pin in one row to the adjacent pin in the next row is the same as the distance between adjacent pins in said one row.

* * * * *